United States Patent [19]
Mölne

[11] Patent Number: 5,943,611
[45] Date of Patent: Aug. 24, 1999

[54] CELLULAR RADIOTELEPHONES INCLUDING MEANS FOR GENERATING A SEARCH REQUEST DATA SIGNAL AND RECEIVING A TELEPHONE NUMBER FROM A NETWORK DIRECTORY DATABASE AND RELATED METHODS

[75] Inventor: Anders Lennart Mölne, Raleigh, N.C.

[73] Assignee: Ericsson Inc., Research Triangle Park, N.C.

[21] Appl. No.: 08/908,148

[22] Filed: Aug. 6, 1997

Related U.S. Application Data

[62] Division of application No. 08/552,003, Nov. 2, 1995, Pat. No. 5,689,547.

[51] Int. Cl.$^6$ .............................. H04B 1/34; H04M 1/00; H04M 11/00; H04J 3/24
[52] U.S. Cl. .......................... 455/89; 379/355; 379/354; 379/94.1; 370/349
[58] Field of Search ...................................... 370/349, 338, 370/346; 379/94.1, 201, 355, 354; 455/414, 89

[56] References Cited

U.S. PATENT DOCUMENTS

| | | | |
|---|---|---|---|
| 4,736,405 | 4/1988 | Akiyama ..................................... | 379/89 |
| 4,812,843 | 3/1989 | Champion, III et al. ............... | 340/905 |
| 4,817,129 | 3/1989 | Riskin ....................................... | 379/88 |
| 5,020,090 | 5/1991 | Morris ....................................... | 379/58 |
| 5,127,040 | 6/1992 | D'Avello et al. ........................ | 379/355 |
| 5,131,020 | 7/1992 | Liebesny et al. ......................... | 379/59 |
| 5,189,632 | 2/1993 | Paajanen et al. ................... | 364/705.05 |
| 5,204,894 | 4/1993 | Darden ...................................... | 379/88 |
| 5,239,577 | 8/1993 | Bates et al. .............................. | 379/201 |
| 5,321,737 | 6/1994 | Patsiokas ................................. | 379/58 |
| 5,337,347 | 8/1994 | Halstead-Nussloch et al. .......... | 379/67 |
| 5,339,352 | 8/1994 | Armstrong et al. ...................... | 379/58 |
| 5,359,651 | 10/1994 | Draganoff ................................ | 379/354 |
| 5,483,586 | 1/1996 | Sussman ................................... | 379/94 |
| 5,535,258 | 7/1996 | Joglekar et al. ........................ | 379/354 |
| 5,561,705 | 10/1996 | Allard et al. ............................ | 379/354 |
| 5,603,084 | 2/1997 | Henry et al. .............................. | 455/89 |
| 5,689,547 | 11/1997 | Molne ................................... | 379/94.1 |
| 5,726,984 | 3/1998 | Kubler et al. ........................... | 370/349 |

FOREIGN PATENT DOCUMENTS

| | | |
|---|---|---|
| 0457077 | 11/1991 | European Pat. Off. . |
| 3629468 | 3/1988 | Germany . |
| 4026179 | 2/1992 | Germany . |
| WO 87/04292 | 7/1987 | WIPO . |
| WO 94/30023 | 12/1994 | WIPO . |

OTHER PUBLICATIONS

PCT International Search Report, PCT/US 96/17245, Apr. 4, 1997.
*Method For Performing Phone Call To Unknown Callees*, IBM Technical Disclosure Bulletin, vol. 36, No. 10, Oct. 1, 1993, XP000412502, p. 605.

*Primary Examiner*—William Cumming
*Attorney, Agent, or Firm*—Myers Bigel Sibley & Sajovec

[57] ABSTRACT

In a method of storing directory information in a cellular radiotelephone, the cellular radiotelephone system is provided with a network directory database including a plurality of telephone numbers. The user is prompted for the input of search criteria, and the input search criteria is accepted. A search request data signal is generated in response to the input search criteria, and this signal is sent to the cellular system. The network directory database is searched for a match with the search criteria, and one or more telephone numbers can be identified. These telephone numbers are returned to the radiotelephone and stored in a memory of the radiotelephone. This method eliminates the need to interact with a directory assistance operator and reduces the time of connection between the radiotelephone and the cellular system.

10 Claims, 5 Drawing Sheets

CELLULAR RADIOTELEPHONES INCLUDING MEANS FOR GENERATING A SEARCH REQUEST DATA SIGNAL AND RECEIVING A TELEPHONE NUMBER FROM A NETWORK DIRECTORY DATABASE AND RELATED METHODS

This application is a divisional of application Ser. No. 08/552,003, filed Nov. 2, 1995 now U.S. Pat. No. 5,689,547.

FIELD OF THE INVENTION

The present invention relates generally to cellular radiotelephone communications, and more particularly to directory assistance for radiotelephone communications.

BACKGROUND OF THE INVENTION

As with conventional wire telephones, the user of a conventional cellular radiotelephone must know the telephone number of the party to be called. In a conventional cellular radiotelephone system, a user who does not know the number of the party to be called can place a call to a directory assistance operator. The directory assistance operator answers the call and uses the name of the party to be called (and possibly other information such as the address) to find the desired telephone number. The telephone number is then communicated verbally back to the user over the cellular radiotelephone.

This system has the drawback that the user must either remember the number or write it down, and then enter the number into the radiotelephone when placing the call. The writing down of the telephone number may be particularly difficult when using a cellular radiotelephone in a mobile environment such as in a car. Furthermore, the user must repeat this process or remember the number the next time a call is made to the same number.

A directory assistance call completion ("DACC") service is discussed in U.S. Pat. No. 5,339,352 entitled "Directory Assistance Call Completion Via Mobile Systems." A cellular user can use the system by dialing the directory assistance number, conversing with the operator to obtain the listing, and then dialing "1" to request actual completion. Accordingly, the DACC service eliminates the need for the subscriber to memorize or write down and then dial a telephone number received during a directory assistance call which can be particularly difficult and potentially hazardous while driving.

The published PCT application entitled "Telecommunications System" (Publication No. WO 94/30023) relates to a global mobile telephone network in which each subscriber unit includes a Subscriber Identity Module. In this system, it is possible to obtain a telephone or fax number from the operator-assisted directory enquiries without the subscriber having to manually enter the number into the communications terminal. To use this feature, the subscriber calls network directory inquiries and gives the name of the person, company or service of which he wishes to ascertain the telephone number, as well as any additional information requested by the operator. The operator then locates the number, confirms it and inquires as to whether the number is to be transmitted verbally, transferred over SMS into a given memory location of the subscriber's SIM card or both.

If the subscriber chooses an SIM update, the voice call is terminated and the operator initiates the SMS process by entering a sequence into a computer or pressing a dedicated button. The telephone number is then encoded into an ECS message at the dispatch center and is posted across the network to the subscriber's communications terminal, which transmits a confirmation to the dispatch center. Subsequently, the subscriber attempts to place a call to the number in the known memory location by keying in the memory location number. The SIM card passes the telephone or fax number to the communications terminal on demand. Upon receipt of the subscriber's confirmation, the communications terminal sets up the call to the desired number.

Notwithstanding the above mentioned references, there continues to exist a need in the art for improved cellular radiotelephones, methods, and systems which provide automated access to a network directory.

SUMMARY OF THE INVENTION

It is therefor an object of the present invention to provide improved cellular radiotelephones, methods, and systems.

It is another object of the present invention to provide automated access to a cellular radiotelephone system network directory.

These and other objects are accomplished according to the present invention by providing a network directory database in a cellular radiotelephone system which can be accessed automatically from a remote cellular radiotelephone without requiring the intervention of a directory assistance operator. In particular, the user can be prompted for search criteria by a visual display on the radiotelephone, and the input search criteria can be sent to the cellular system as part of a search request data signal. This data signal is used to search the database, and telephone numbers matching the search criteria are returned to the radiotelephone.

In addition, information such as names and/or addresses corresponding to the identified telephone numbers can also be returned and displayed. The telephone number (or numbers) returned can be stored in a personal directory within the radiotelephone and retrieved at a later time. Accordingly, the radiotelephone user can retrieve telephone numbers from the cellular system without interacting with a directory assistance operator. In addition, the number can automatically be stored in a memory of the radiotelephone eliminating the need to remember or write down a number retrieved from the directory.

In one embodiment of the present invention, a method of storing directory information in a cellular radiotelephone includes the following steps. A cellular radiotelephone system is provided with a network directory database including a plurality of telephone numbers. The user is prompted for input of search criteria, and the input search criteria is accepted. The prompt can be provided through a visual display on the radiotelephone, and the input search criteria can be accepted by a keypad. A search request data signal is generated within the cellular radiotelephone in response to the search criteria, and this search request data signal is preferably an electronic data signal including the search criteria.

The search request data signal is sent from the cellular radiotelephone to the cellular radiotelephone system, and the network directory database is searched for a match with the search criteria in order to identify a subset of the plurality of telephone numbers. The identified subset of telephone numbers is returned to the cellular radiotelephone, and stored in a memory of the cellular radiotelephone.

The network directory database can further include a plurality of search terms wherein each of the telephone numbers is associated with a respective search term. In this example, the network directory database is searched by comparing at least a portion of the search request data signal with the search terms, choosing a subset of the plurality of search terms which match the portion of the search request data signal, and identifying a subset of the plurality of telephone numbers associated with the chosen subset of the plurality of search terms. Accordingly, the search can be based on one or more of names, initials, or addresses. In addition, the chosen search terms can also be returned to the cellular radiotelephone and displayed to the user.

An individual telephone number can also be selected from the subset of telephone numbers returned to the radiotelephone, and stored in a personal directory in the cellular radiotelephone. A cellular radiotelephone communication can then be placed using the individual telephone number.

In another embodiment of the present invention, a cellular radiotelephone can initiate a search of a network directory database and receive telephone numbers from the network directory database. This radiotelephone includes a memory which can be used to store telephone numbers received from the network directory database. This radiotelephone also includes prompting means for prompting a user of the radiotelephone to enter input search criteria, and accepting means for accepting the input search criteria. The prompting means can be a visual display such as an LCD display on the radiotelephone or audible prompting instructions, and the accepting means can be a keypad or other user input device such as a touch screen or a voice activated input.

The radiotelephone includes generating means, such as a microprocessor, for generating a search request data signal within the cellular radiotelephone in response to the input search criteria. This search request data signal comprises a first electronic data signal including the search criteria. Transmission means, such as a transmitter, transmits the search request data signal from the radiotelephone to a cellular radiotelephone system where at least a portion of the search request data signal is compared with a network directory database in order to identify at least one telephone number.

Reception means, such as a receiver, receives a return data transmission from the cellular radiotelephone system. This return data transmission comprises a second electronic data signal including the telephone number. The radiotelephone also includes storage means for storing the telephone number in the memory of the cellular radiotelephone. The radiotelephone can also include calling means for establishing a cellular radiotelephone communication using the telephone number in the memory. For example, a dedicated function key can be used to initiate the call using the received telephone number.

The return data transmission can also include a plurality of telephone numbers, and these numbers can all be stored in the memory. In addition, the network directory database can include a plurality of search terms wherein each of the search terms is associated with a respective telephone number. In this case, the search request data signal can be compared with the search terms to locate desired telephone numbers. Furthermore, the search terms associated with each of the returned telephone numbers can be included in the return data transmission and stored in the memory location. Accordingly, a display, such as a visual display, can be used to display the telephone numbers in the memory as well as the respective search terms.

After viewing the telephone numbers in the memory, designation means, such as a dedicated function key, can be used to designate one of the telephone numbers and store it in a personal directory in the radiotelephone. Calling means, such as another dedicated function key, can be included on the radiotelephone to establish a radiotelephone communication using the designated telephone number.

In still another embodiment of the present invention, a cellular radiotelephone system includes a network directory database comprising a plurality of telephone numbers. The cellular system includes reception means, such as a receiver, for receiving a search request data signal from a cellular radiotelephone. This search request data signal comprises a first electronic data signal including search criteria generated by the cellular radiotelephone in response to prompts for user input followed by user input of the search criteria. The cellular system also includes search means (such as a general purpose computer with special purpose software, a special purpose computer, or special purpose hardware) for searching the network directory database for a match with the search criteria in order to identify a subset of the plurality of the of telephone numbers. Finally, the cellular system includes transmission means, such as a transmitter, for transmitting a second electronic data signal including the subset of telephone numbers to a memory of the cellular radiotelephone.

Accordingly, the methods, radiotelephones, and systems of the present invention allow the user of a cellular radiotelephone to access a network directory without the intervention of a directory assistance operator. The user can be provided with visual prompts and enter search criteria in response to these prompts. The remainder of the search can be automated requiring no further action from the user. In fact, the telephone number can be located and returned to the radiotelephone where it is automatically stored in a memory location. Once the telephone number is stored in the telephone, the user can view it on a visual display and place a call using the number by pressing a dedicated function key.

The invention allows directory assistance service to be provided while reducing the connection time required between the radiotelephone and the cellular system. This reduction in connection time is achieved because one data message from the radiotelephone to the cellular system can be used to initiate the service, and one data message from the cellular system to the cellular phone can be used to transmit the telephone number or numbers. Accordingly, the cost of directory assistance can be reduced for a cellular radiotelephone.

DETAILED DESCRIPTION OF PREFERRED EMBODIMENTS

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those having skill in the art. Like numbers refer to like elements throughout.

Figure 1:
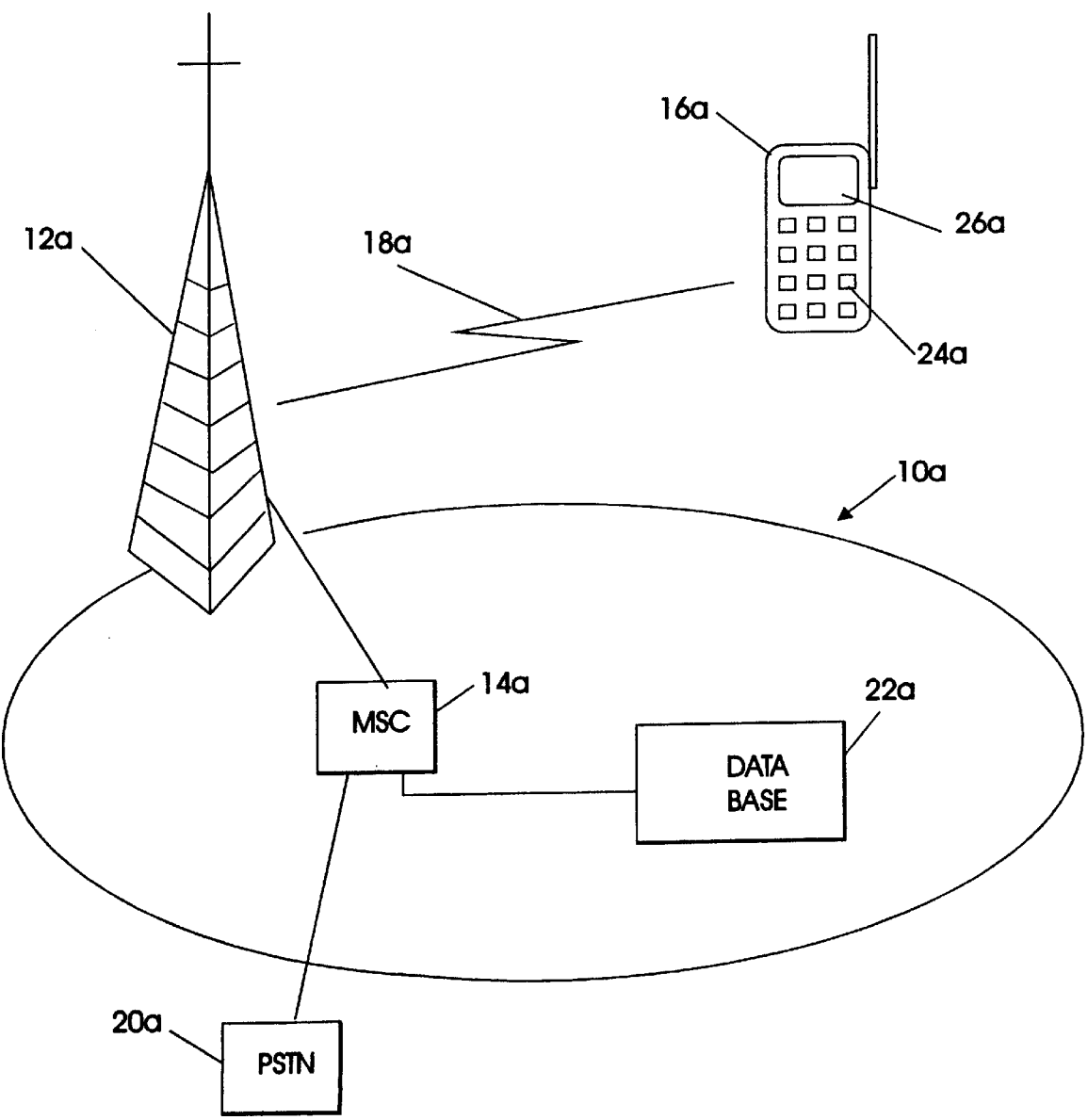
FIG. 1 is a schematic view of an analog cellular radiotelephone and system including an integrated network directory database.

Referring now to FIG. 1, an analog cellular system 10a, according to the present invention, includes one or more radio base stations ("RBS") 12a and a Mobile Switching Center ("MSC") 14a, also known as a mobile telephone switching office. This cellular system can be implemented according to various analog protocols including AMPS, TACS, and NMT. In normal operation, the analog cellular system provides cellular radiotelephone communications to and from one or more cellular radiotelephones 16a within range of RBS 12a. This radiotelephone communication is provided over a wireless communication path 18a. Accordingly, the analog cellular system 10a can facilitate wireless communications between the illustrated radiotelephone 16a and a second radiotelephone. In addition, the cellular system is preferably connected to a Public Switched Telephone Network ("PSTN") 20a, also referred to as the wire telephone network, through the MSC, thereby allowing communication between the radiotelephone 16a and a conventional telephone. As will be understood by those having skill in the art the term radiotelephone can be defined to include a personal digital assistant, a computer with a wireless modem, or any other device capable of sending and receiving data to and from a wireless communications system.

In particular, the analog cellular system of FIG. 1 provides a network directory database 22a which allows the user of the cellular radiotelephone 16a to obtain a desired telephone number without requiring interaction with a directory assistance operator. In this system, the user is prompted for search criteria which can be entered by using keypad 24a on the radiotelephone. The prompts can be provided through a visual display 26a such as an LCD display or row dot matrix display on the cellular radiotelephone 16a. Alternatively, the prompts can be provided audibly such as through a synthesized voice. The cellular radiotelephone 16a then generates a search request data signal in response to the input search criteria and this search request data signal can be an electronic data signal including the search criteria.

The search request data signal is sent to the cellular system 10a which includes a network directory database 22a. The network directory database 22a can include information such as telephone numbers and search terms, wherein each of the search terms is associated with a respective telephone number. The network directory database 22a is searched to find a match with the search criteria in order to identify a telephone number which is returned to the cellular radiotelephone 16a and stored in a memory therein. Accordingly, the user of the cellular radiotelephone can then place a call using the telephone number in the memory. Furthermore, this telephone number is obtained without going through a directory assistance operator.

In the analog cellular system 10a of FIG. 1, the network directory database 22a is integrated into the system, and this directory is used to provide telephone numbers to cellular radiotelephone users. The network directory database 22a has information including telephone numbers and search terms wherein each search term is associated with a respective telephone number. Accordingly, by using search criteria such as a last name, a first name, a middle name, an initial, and/or an address, a desired telephone number can be obtained. "Yellow pages" search criteria, which identify a professional classification, may also be used.

As shown, signals from the cellular radiotelephone 16a pass over the wireless communication path 18a to the base station 12a and the MSC 14a. When having a conventional radiotelephone conversation, a voice channel is established in both directions over this wireless communication path and then on to either the PSTN 20a or to another cellular radiotelephone. When accessing the network directory database, a voice channel is established over the wireless communication path 18a to the base station 12a, but the path is diverted at the MSC 14a to the network directory database 22a.

The voice channel between the cellular radiotelephone 16a and the network directory database 22a is used to send a search request data signal from the radiotelephone to the database, and to return at least one telephone number from the database to the radiotelephone. In both directions, information is sent as a data signal thereby eliminating the need for a directory assistance operator.

The search request data signal can be generated within the cellular radiotelephone 16a and this search request data signal can be an electronic data signal including search criteria. This data signal can be converted to modem signals for transmission across the voice channel by a modem within the cellular radiotelephone 16a. The data signals can be sent across the voice channel as DTMF signals or any other analog modem signals known to those having skill in the art.

The modem signals can be converted back to data signals by a modem within the cellular system 10a and then sent to the database. In one embodiment, a search request data signal is generated within the radiotelephone 16a and converted to modem signals. These modem signals are then passed over a voice channel from the cellular radiotelephone 16a to the base station 12a and then to the MSC 14a were a second modem converts these modem signals to electronic search request data signals. The search request data signals are then sent to the network directory database 22a in order to locate a desired telephone number.

As discussed above, the network directory database 22a can include a plurality of telephone numbers and a plurality of search terms, wherein each search term is associated with a respective telephone number. For example, each telephone number can have as associated search terms a first name, a last name, a middle name, initials, and/or an address. The search criteria input by the radiotelephone user can include one or more of a first name, a last name, a middle name, an initial, and/or an address. Accordingly, after searching the search terms, matches between the search criteria and the search terms are used to identify telephone numbers associated with the matching search terms. In addition, portions of telephone numbers can be used as search terms.

The identified telephone number (or numbers) are then returned to the cellular radiotelephone 16a through the MSC 14a and the base station 12a. Telephone numbers are returned from the cellular system 10a over the wireless communication path 18a as electronic data signals. In particular, the telephone numbers can be sent from the database 22a to the MSC 14a as electronic data signals and converted to modem signals by a modem in the MSC 14a. These modem signals are then sent over the voice channel to the RBS 12a and then to the cellular radiotelephone 16a. The modem in the cellular radiotelephone 16a converts the modem signals to electronic data allowing the telephone number (or numbers) to be stored in a memory within the cellular radiotelephone. Accordingly, the transfer of data to and from the cellular radiotelephone 16a can take place using a voice channel without using either the speaker or microphone of the radiotelephone.

The stored telephone number or numbers can be displayed on the visual display 26a allowing the user to decide whether to place a call. For example, the user can view each telephone number returned to the radiotelephone and then decide whether to keep or use any of the numbers. Alternately, the telephone numbers can be audibly communicated through a voice synthesizer. Desired numbers can be stored in semipermanent memory in the radiotelephone such as a personal directory within the radiotelephone. A call can be placed using a telephone number stored in the radiotelephone memory or directory by pressing a predetermined function key on the keypad 24a.

In addition, search terms can be returned to the radiotelephone 16a with the associated telephone number and stored in a memory location within the radiotelephone. For example, a name and/or address can be returned with each telephone number and viewed on the display 26a. Accordingly, if more than one telephone number is returned, this information can be used to choose the desired telephone number. That is, a name used as a search criteria can identify multiple telephone numbers, but the address may allow the user to pick the one desired number. The desired number and associated search term or terms can then be stored together in a personal directory within the radiotelephone allowing the user to locate the telephone number at a later time without going through the cellular system 10a.

The user of the cellular radiotelephone 16a can initiate the search for a telephone number at the network directory database 22a by pressing a predetermined function key on the radiotelephone keypad 24a. This action initiates a prompting function within the radiotelephone prompting the user for search criteria. For example, the radiotelephone prompts the user to enter a first name or initial, a last name or initial, a middle name or initial, and an address. The user can skip prompts that ask for information that is not known, and the radiotelephone 16a generates the search request data signal using all information supplied by the user. Depending on the information provided by the user, one or more telephone numbers may be identified. If a manageable number of telephone numbers are identified, they can all be returned to the radiotelephone for the user to choose from.

If too many telephone numbers are identified, a message indicating that too many numbers were identified can be returned. The radiotelephone prompting function can then automatically prompt the user for any search criteria which was not provided in the first search. If more information is provided, then the search can be reinitiated.

Furthermore, the network directory database can be divided into a plurality of subdirectories within the database, each being directed to a subgroup of telephone numbers. For example, different subdirectories can include telephone numbers for a city, a company, and a personal directory. Accordingly, the user can designate the subdirectory to be searched thereby reducing the field of the search. For example, a company can have a subdirectory giving the telephone numbers of its employees. Alternately, each cellular account can have an associated subdirectory wherein telephone numbers chosen by the account user are stored, and this personal subdirectory can be limited to access only by the account user.

The cellular radiotelephone 16a can prompt the user for input of search criteria by running a prompting routine stored in the cellular radiotelephone 16a. For example, a function key on the keypad can be used to start an internal program which in turn prompts the radiotelephone user to enter search criteria. Visual prompts can be displayed on the display 26a and search criteria can be input through the keypad 24a. After the search criteria has been entered, the prompting routine can generate the search request data signal including the search criteria, and this search request data can be sent to the cellular network.

Alternately, the prompting routine can be stored in the cellular system, and the step of prompting for user input of search criteria can occur interactively between the radiotelephone 16a and the cellular system 10a. For example, a function key on the radiotelephone 16a can be used to initiate a data transmission to the cellular system to start the prompting routine. Prompting commands generated by the cellular system are sent to the radiotelephone 16a via the wireless communication path 18a. Prompting messages requesting search criteria are displayed on the visual display 26a and the user responds by depressing appropriate keys on the keypad 24a. The input search criteria are sent to the cellular system as they are input, and the search can be stopped by the cellular system 10a when a unique telephone number has been identified. Accordingly, the radiotelephone and the cellular system can communicate back and forth with each prompt and user response allowing interactive searches.

Figure 2:
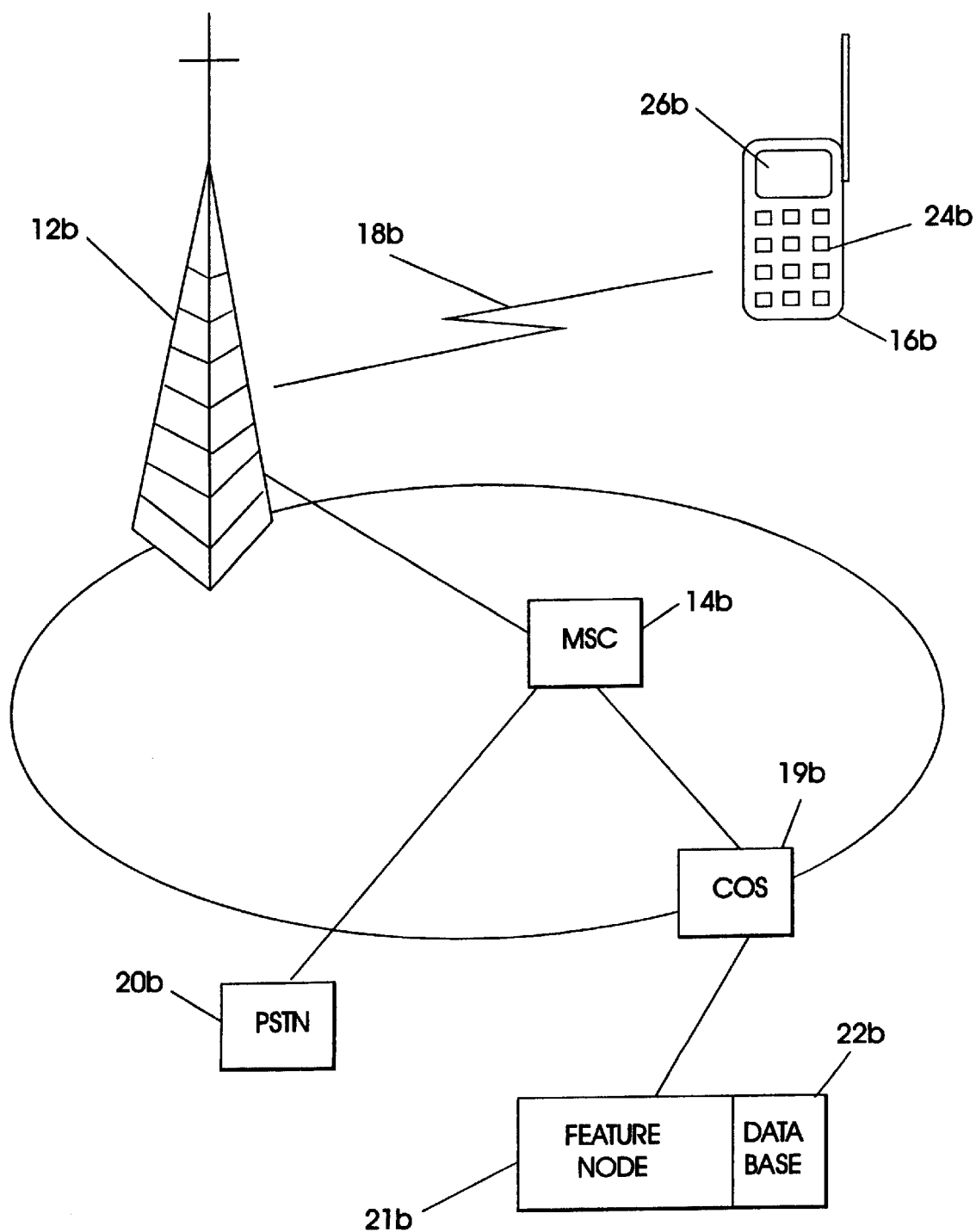
FIG. 2 is a schematic view of an analog cellular radiotelephone and system including an add-on network directory database.

In FIG. 2, the network directory database 22b is implemented outside the analog cellular system 10b. As before, the cellular radiotelephone transmits and receives information to and from the cellular system 10b via the wireless communication path 18b and the RBS 12b. Again, conventional voice communications can be supported between the radiotelephone 16b and a second radiotelephone, or a conventional telephone through the PSTN 20b.

In FIG. 2, however, an add-on feature node 21b outside the analog cellular system 10b supports the network directory database 22b. In particular, signals from the cellular radiotelephone 16b are transmitted over the wireless communications path 18b to the base station 12b, the MSC 14b, and the Central Office Switch ("COS") 19b. From the COS 19b, the signals are sent to the feature node 21b which supports the network directory data base 22b. The path from the radiotelephone 16b to the feature node 21b can be a conventional analog voice path thereby eliminating the need for any modification to the conventional analog cellular system 10b.

As before, the radiotelephone 16b can include a modem to convert search request data signals to modem signals for transmission over this analog voice path. In the cellular system of FIG. 2, however, the second modem is included in the feature node 21b to convert the modem signals back to data signals. The search request data signals can then be sent to the network directory data base 22b as before. Again a prompting routine can be included in the radiotelephone 16b, or the prompting routine can be included in the feature node 21b for interactive prompting between the radiotelephone 16b and the network directory database 22b. The network directory database 22b can also include a plurality of subdirectories as previously discussed.

As an example, access to the network directory database 22b of FIG. 2 can be provided as follows. In response to prompts, the radiotelephone user inputs company directory and the initials "KM" via the keypad 24b. The cellular radiotelephone 16b sets up a call to the feature node 21b, and the feature node answers the call and verifies the radiotelephone 16b. The feature node 21b can also signal service messages and ready. The cellular radiotelephone receives the ready signal and then transmits the search request. In this case the search request is for telephone numbers in the company directory belonging to persons with the initials KM. The feature node 21b acknowledges receipt of the search request data signal and initiates a search in the company subdirectory database. The database receives the search request, finds all matches, and sends the result to the feature node. The results are sent by the feature node to the radiotelephone 16b where they can be displayed. The user can then display the names and telephone numbers located by the network directory database, and store the desired number in the personal directory of the radiotelephone 16b. The user can also place a call to the desired telephone number. The call can either be set up as a new call or set up through the feature node 21b as part of the search request.

Figure 3:
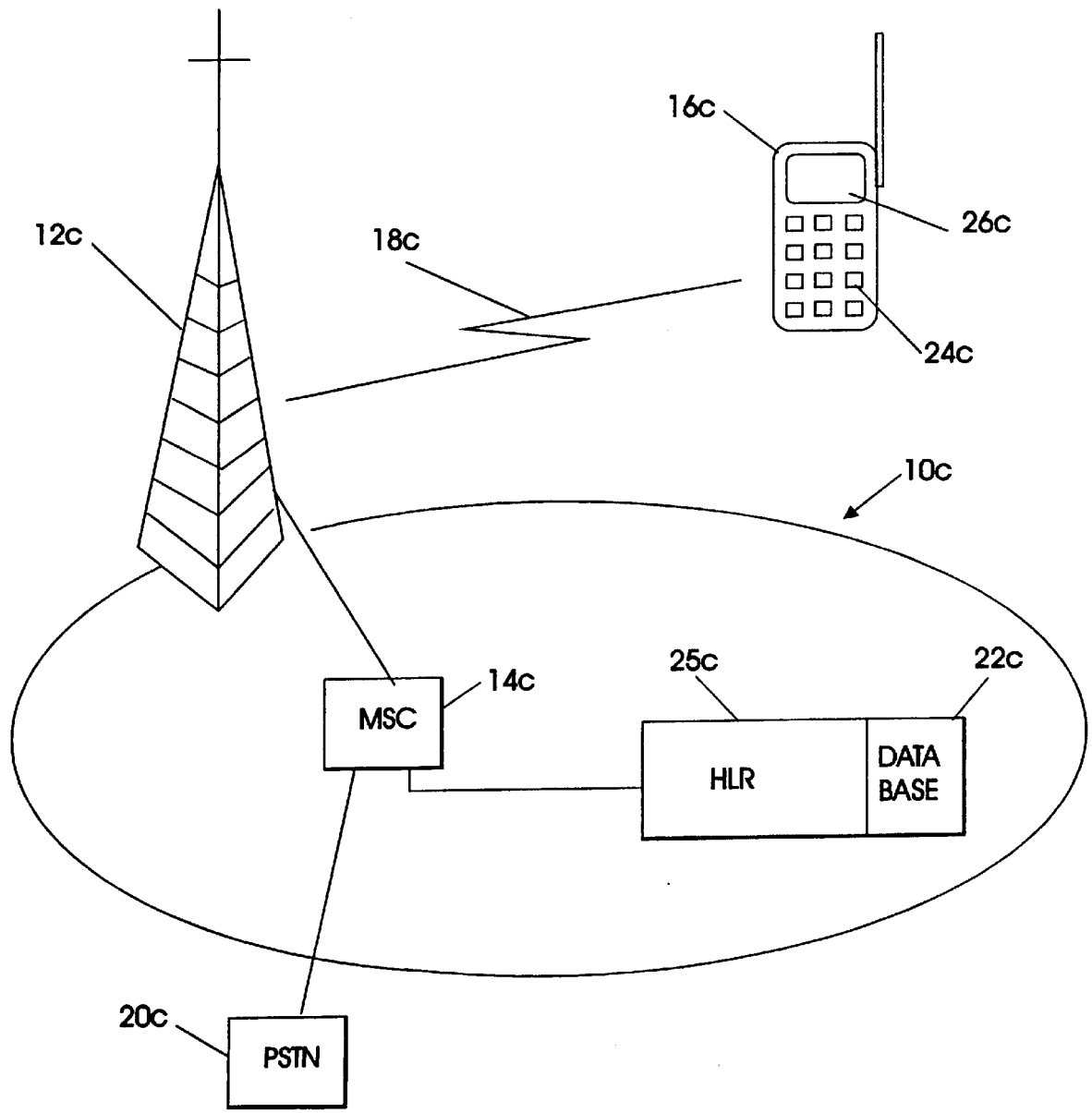
FIG. 3 is a schematic view of a digital cellular radiotelephone and system including an integrated network directory database.

The network directory database 22c can also be implemented as an integrated part of a digital cellular system 10c, as shown in FIG. 3. For example, the digital cellular system 10c can be implemented according to the GSM, D-AMPS, PDC, DCS1800, PCS1900, or CDMA standards. In this system, the digital cellular radiotelephone 16c can include user interfaces such as a visual display 26c and a keypad 24c, as discussed above with regard to the analog systems. Furthermore, the user interfaces of this digital radiotelephone 16c can be implemented, for example, as a touch screen display or multi-row display operated in conjunction with a keypad.

When the radiotelephone 16c is used for conventional voice communications, a digital control channel is used to initiate a cellular communication between the cellular radiotelephone 16c and the RBS 12c of the digital cellular system 10c. An exchange over the control channel is used to set up a digital voice channel between the radiotelephone 16c and the RBS 12c. This voice channel can support communications between the radiotelephone 16c and a second radiotelephone or a conventional telephone. For example, to communicate with a conventional telephone, the voice channel crosses from the radiotelephone 16c to the RBS 12c over the wireless communication path 18c, to the MSC 14c, to the PSTN 20c, and then to a conventional telephone.

When the digital radiotelephone 16c is used for accessing the network directory database 22c, a digital control channel can be used to complete the data search without opening a voice channel. For example, the data can be sent using SMS or USSD protocols, or other digital protocols known to those having skill in the art. As shown, a digital control channel can be established between the digital radiotelephone 16c and the network directory database 22c through the wireless communication path 18c, the radio base station 12c, the MSC 14c, and the Home Location Register ("HLR") 25c. Accordingly, a search request data signal can be sent from the digital radiotelephone 16c to the network directory data base 22c without the need for special modems in either the radiotelephone 16c or the cellular system 10c. The use of a digital control channel to transmit search criteria and results can reduce the air time required to transmit this information, thereby reducing cellular access costs. Alternatively, a dedicated data channel can be established between the radiotelephone and the cellular system allowing a continuous data connection between the radiotelephone and cellular system.

In the digital system of FIG. 3, the radiotelephone can include a prompting routine which prompts the user for search request information through the visual display 26c. The user responds by entering the search request information through the keypad 24c. This search request information is accepted by the radiotelephone and can be included in a single search request data signal which is sent by a control channel to the network directory database 22c. Alternately, the prompting routine can be included in the cellular system 10c, each prompt being generated within the cellular system 10c and sent over a control channel to the radiotelephone 16c where the prompt is communicated through the visual display. With individual prompts from the cellular system, each item of search request information can be individually input through the keypad, accepted by the radiotelephone and sent to the network directory database 22c. Accordingly, the prompting and accepting of search request information can be interactive, allowing the search to be completed as soon as a unique telephone number is identified which can often occur before all information has been prompted for or accepted.

The digital cellular system 10c of FIG. 3 can support interactive searches of the network telephone directory 22c using various digital protocols for control channel signaling. For example, in the IS-136 protocol, there is open user specific signaling available in the control channel. Alternately, in the GSM protocol, unstructured supplementary service data ("USSD") is a user specific signaling which can be addressed to different parts of the cellular system 10c such as the RBS 12c, the MSC 14c, or the HLR 25c. Data can also be transmitted as SMS (Short Message Service) data on the control channel. As shown in FIG. 3, the search request data signal (or signals) would be addressed to the HLR 25c which has access to the network directory data base 22c. Accordingly, information can be signaled back and forth between the radiotelephone 16c and the digital cellular system 10c.

As an example, a user of the radiotelephone 16c can obtain a telephone number from the network directory database as follows. The user presses a key on the radiotelephone 16c to initiate the search. In response to prompts displayed on the visual display 26c, the user chooses to search the company subdirectory for the telephone number of an individual with the initials "KM", and this information is input through the keypad 24c. The radiotelephone 16c sends a signal over the control channel to the HLR 25c to search the company directory for telephone numbers associated with the initials "KM". The HLR identifies and acknowledges the radiotelephone, and starts the search in the company subdirectory within the network directory database 22c.

The network directory database 22c receives the search order, conducts the search, and sends the search result to the HLR. The HLR sends the search results to the radiotelephone as a network service data message. As shown, this network service data message is sent from the HLR 25c through the MSC 14c, the RBS 12c, and the wireless communication path 18c to the radiotelephone 16c. The radiotelephone 16c receives the data message which can include a plurality of names with the initials "KM" and the respective telephone numbers. For the purpose of this example, the data message can include three names and telephone numbers. Each name and respective telephone number can be displayed on the visual display 26c, and the user can select the desired number, save it in a directory within the radiotelephone, and make a call using the selected number.

Figure 4:
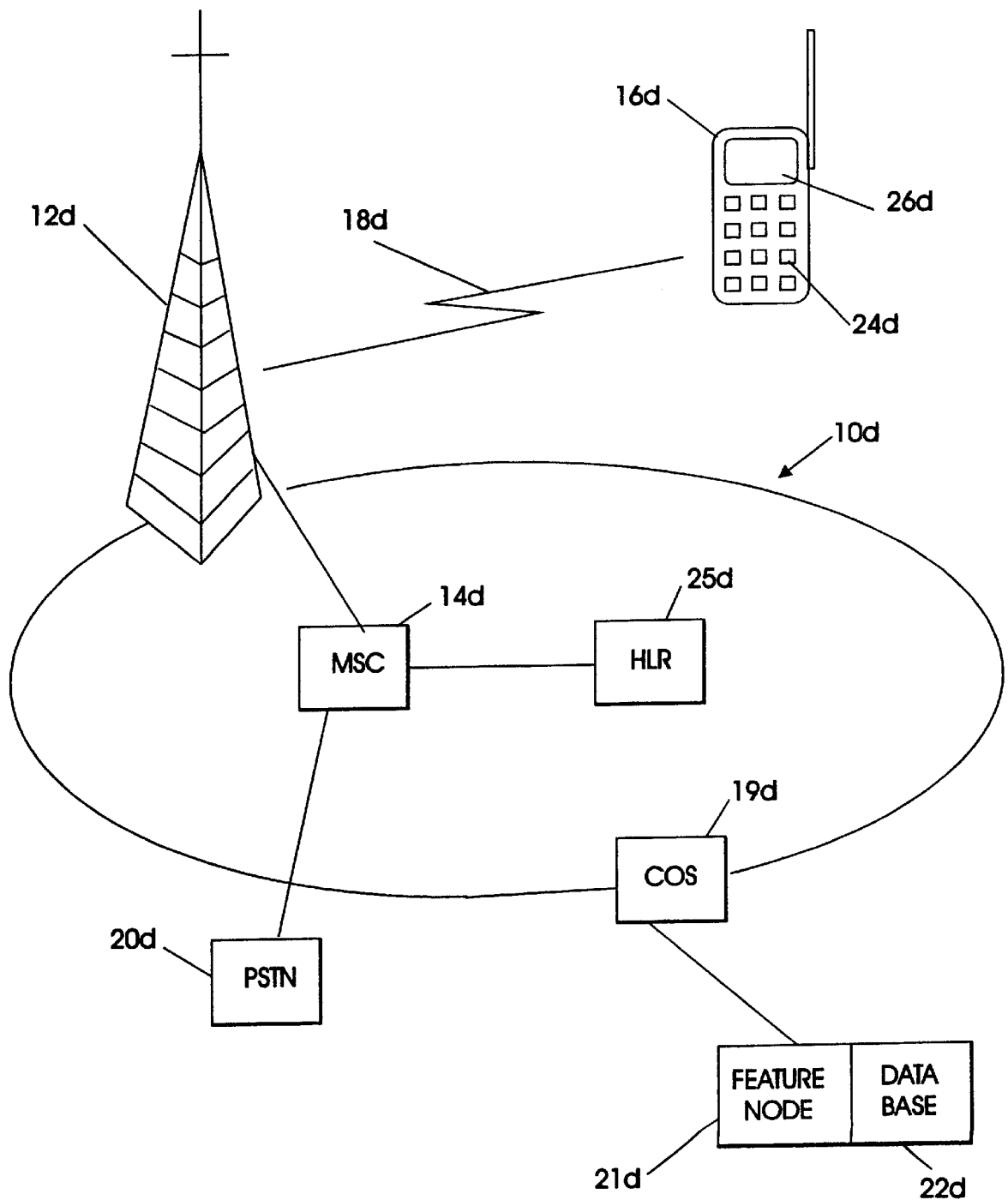
FIG. 4 is a schematic view of a digital cellular radiotelephone and system including an add-on network directory database.

The network directory data base 22d can also be supported through a feature node 21d external to a digital cellular system 10d as shown in FIG. 4. In this example, a call is set up over a voice channel from the radiotelephone 16d to the feature node 21d. As shown, the voice channel runs from the radiotelephone 16d through the radio base station 12d, the MSC 14d, and the central office switch ("COS") 19d to the feature node 21d. In this example, modems in the radiotelephone 16d and the feature node 21d can be used to convert data sent to and from the radiotelephone 16d and the feature node 21d. This implementation operates in a manner similar to the implementation of FIG. 2, and reduces any need to modify a conventional digital cellular system in order to support the network directory database.

Figure 5:
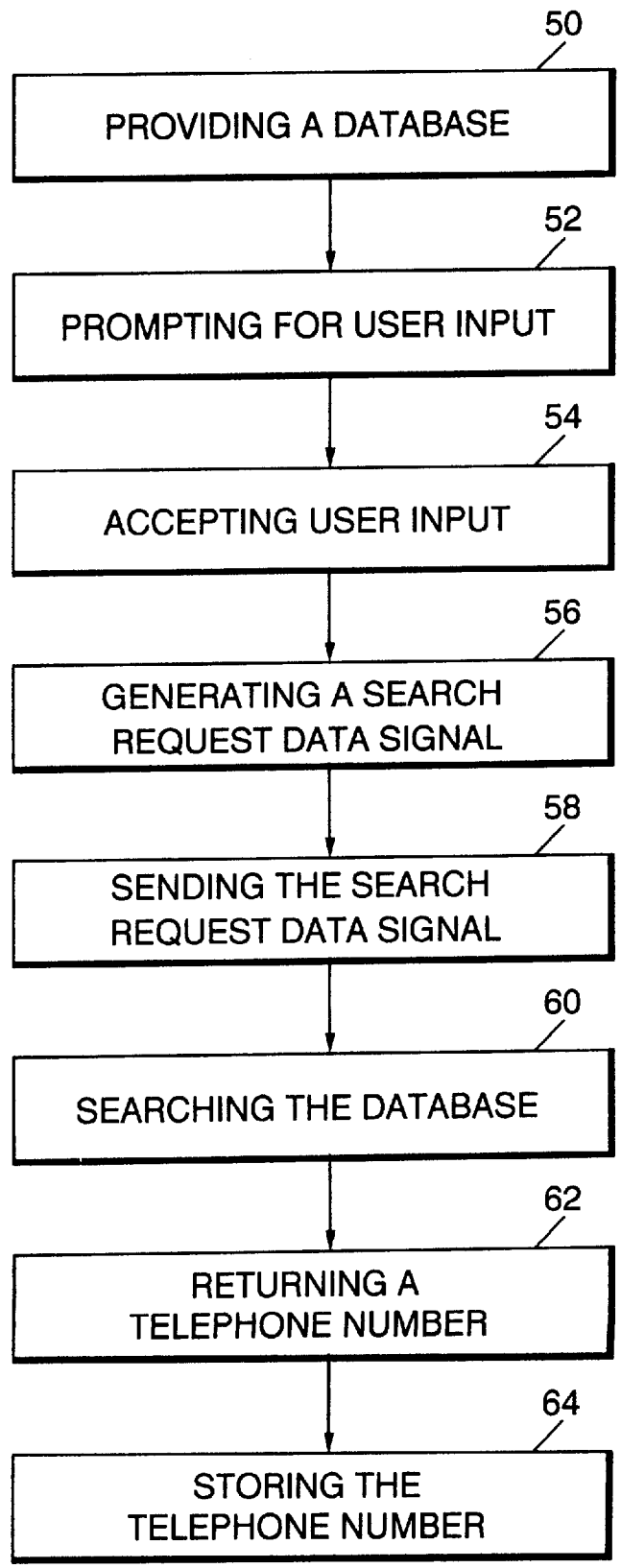
FIG. 5 is a block diagram illustrating the storage of directory information in a cellular radiotelephone according to the present invention.

A block diagram of operations according to the present invention is illustrated in FIG. 5. The cellular system is provided with a network directory database 50, and this network directory database includes a plurality of telephone numbers. In addition, the network directory database can include a plurality of search terms, wherein each of the telephone numbers is associated with one or more respective search terms. The search terms can include first names, last names, middle names, initials, and addresses.

The user can initiate a search of the network directory database by depressing a dedicated function key. The user is then prompted for input of search criteria 52, and this user input is accepted by the cellular radiotelephone 54. A search request data signal is generated in the radiotelephone in response to the input search criteria 56. The search request data signal is preferably an electronic data signal including the search criteria. This search request data signal is sent from the radiotelephone to the cellular system 58.

The information in the network directory database is then searched 60 for a match with the search criteria to identify a subset of the telephone numbers. This search can include the steps of comparing the search criteria from the search request data signal with the search terms, choosing a subset of the search terms which match the search criteria from the search request data signal, and identifying telephone numbers associated with the chosen search terms.

The telephone number or numbers identified in the search are returned to the radiotelephone 62. This telephone number (or numbers) can be stored in a memory location of the radiotelephone 64. In addition, if more than one telephone number is returned to the radiotelephone and stored, an individual one of these telephone numbers can be selected, stored in a personal directory in the radiotelephone, and the selected number can be used to place a radiotelephone call. For example, the telephone numbers can be displayed on a visual display on the radiotelephone allowing the user to choose which number to save and/or call. In addition, the returning step can include the step of returning names or other information corresponding to respective telephone numbers which can also be displayed on the visual display of the radiotelephone. As will be understood by those having skill in the art, these operations can be implemented with any of the cellular systems illustrated in FIGS. 1–4.

In the drawings and specification, there have been disclosed typical preferred embodiments of the invention, and although specific terms are employed, they are used in a generic and descriptive sense only and not for purposes of limitation, the scope of the invention being set forth in the following claims.

That which is claimed:

1. A method for operating a cellular radiotelephone including memory within a cellular communications system including a network directory database including a plurality of telephone numbers, the method comprising the steps of:

prompting a user of said cellular radiotelephone to enter input search criteria;

accepting said input search criteria;

generating a search request data signal within said cellular radiotelephone in response to said input search criteria, said search request data signal including said search criteria;

transmitting said search request data signal from said cellular radiotelephone to a cellular radiotelephone system wherein at least a portion of said search request data signal is compared with the network directory database to identify at least one telephone number of the plurality of telephone numbers;

receiving a return data signal from said cellular radiotelephone system, said return data signal including said telephone number; and storing said telephone number in said memory.

2. A method according to claim 1 wherein said transmitting step comprises transmitting said search request data signal over a digital control channel.

3. A method according to claim 1 further comprising the step of establishing a cellular radiotelephone communication using said telephone number in said memory.

4. A method according to claim 1 wherein said network directory database information includes a plurality of telephone numbers and a plurality of search terms, each of said search terms being associated with a respective telephone number, and wherein said search request data signal is compared with said search terms to locate a subset of said plurality of telephone numbers, and wherein said return data transmission comprises said subset of telephone numbers, and wherein said subset of telephone numbers is stored in said memory.

5. A method according to claim 4 wherein said return data transmission further comprises a subset of said plurality of search terms, each of said search terms of said subset being associated with a respective telephone number in said subset of telephone numbers, and wherein said subset of search terms are stored in said memory.

6. A method according to claim 4 further comprising the step of displaying said plurality of telephone numbers in said memory.

7. A method according to claim 6 further comprising the steps of designating one of said telephone numbers in said subset and storing said designated telephone number in a personal directory in said cellular radiotelephone.

8. A method according to claim 7 further comprising calling means for establishing a cellular radiotelephone communication using said designated telephone number.

9. A method according to claim 1 further comprising a the step of converting said search request data signals to modem signals.

10. A method according to claim 1 wherein:

said prompting step comprises prompting for user input of a plurality of items of search criteria;

said accepting step comprises accepting user input of each of said plurality of items of search criteria;

said generating step comprises generating a separate search request data signal in response to each of said plurality of items of search criteria; and said transmitting step comprises transmitting each of said search request data signals separately.

* * * * *